No. 749,978. PATENTED JAN. 19, 1904.
C. W. ZARING.
COMPOSITE BLOCK FOR SOFT TREADS AND METHOD OF MAKING SAME.
APPLICATION FILED MAY 1, 1903.
NO MODEL.

Witnesses
William H. Cous
Edward J. Ryan.

Inventor
Charles W. Zaring
By his Attorney
Wm B. Whitney

No. 749,978.
Patented January 19, 1904.

UNITED STATES PATENT OFFICE.

CHARLES W. ZARING, OF NEW YORK, N. Y.

COMPOSITE BLOCK FOR SOFT TREADS AND METHOD OF MAKING SAME.

SPECIFICATION forming part of Letters Patent No. 749,978, dated January 19, 1904.

Application filed May 1, 1903. Serial No. 155,094. (No model.)

*To all whom it may concern:*

Be it known that I, CHARLES W. ZARING, a citizen of the United States, residing in the city of New York, in the county and State of New York, have invented certain new and useful Improvements in Composite Blocks for Soft Treads and in the Methods of Making the Same, of which the following is a specification.

My invention relates to the class of soft treads which are composed of sheets or strips of wire-cloth, canvas, or other woven fabric filled in and between with rubber or similar cohesive material and pressed into a compact and, as nearly as possible, homogeneous mass or block; and it has for its object to provide a method of making blocks of this general character, but with certain novel features, all as hereinafter described, and illustrated in the accompanying drawings, in which—

Figure 1:
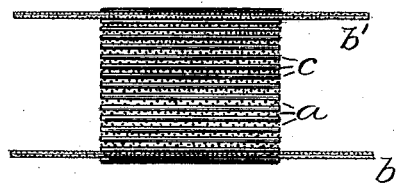
Figure 2:
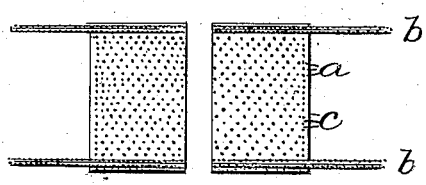
Figure 4:
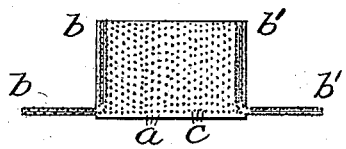
Figure 3:
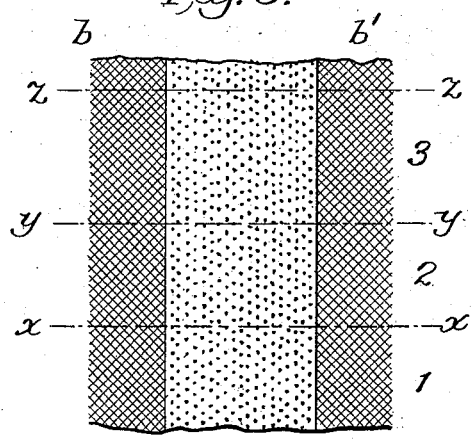

Figure 1 is an end view of a blank from which two tread-blocks are to be made; Fig. 2, the same view showing the blank cut into block; Fig. 3, a longitudinal plan of one of the blocks turned over, so as to have its cut surface uppermost; and Fig. 4 an end view of the block shown in Fig. 3.

In carrying out my process I first build up a blank to the required height by piling up strips of woven fabric, preferably wire-cloth cut bias, using for the body of the blank strips $a$ of a width double or nearly double the height of the treads which are to be made and both at the bottom and top one or more strips $b\ b'$, which are wider, so that their edges will project beyond the body of the blank on each side, and either coating the strips with rubber before piling them up or interposing layers of rubber $c$ between the strips as they are piled up, or both. I then apply pressure to the blank, so as to force the rubber into all the interstices between the wires or threads or strands of the strips and compact the mass, preferably placing the blank in a die with sides spaced so as to allow the rubber filling to spread a little or as much as may be desired beyond the edges of the strips of fabric, and, finally, I cut the blank thus formed down through its longitudinal center, thereby making two blocks, which may be made of suitable length for use in rubber tires or may in turn be cut up into sections, as 1, 2, and 3, Fig. 3, suitable for use in the frog-cushion of horseshoe-pads or for any other purpose. The rubber may be vulcanized either before or after the blank has been cut into blocks; but I prefer to leave this step, which is not essential to my process, until after the block or section has been incorporated in the piece of which it is to form the tread-surface.

Among the advantages possessed by a block thus made it may be mentioned that the ends of the wires or strands of the fabric are exposed in the cut surface, which is designed to be used for the tread, and give it very desirable frictional and wearing qualities. Again, the projecting edges of the outer strips of the fabric may be embedded in the tire or pad or other article with which the block is used and furnish a means for securing it firmly therein, and the block may be made an integral part of the tire or pad or other article by vulcanizing the rubber left on the sides and bottom of the block to the rubber walls of the article in which it has been incorporated.

While I have mentioned rubber as the material which is used to fill the interstices between the strips of fabric and between the wires or strands of those strips, I do not wish to limit myself thereto, since it is obvious that rubber compound or any similar cohesive material may be used in its place.

What I claim as new, and desire to secure by Letters Patent, is—

1. The process of making composite blocks, which consists in building up a blank with strips of woven fabric filled in and between with a cohesive material, using for the bottom and top one or more strips which are wider than the intermediate strips and then subjecting the blank to pressure and dividing it into blocks.

2. The process of making composite blocks, which consists in building up a blank with strips of woven fabric alternating with strips of a cohesive material, using for the bottom and top strips of fabric which are wider than the intermediate strips, and then subjecting the blank to pressure and dividing it into blocks.

3. The process of making composite blocks, which consists in building up a blank with strips of wire-cloth cut bias and filled in and between with rubber, using for the bottom and top strips of wire-cloth which are wider than the intermediate strips, and then subjecting the blank to pressure and dividing it into blocks.

4. The process of making composite blocks, which consists in building up a blank with strips of wire-cloth alternating with strips of rubber, the strips of wire-cloth at the bottom and top being wider than the intermediate strips, and then subjecting the blank to pressure and dividing it into blocks.

5. A composite block composed of strips of woven fabric filled in and between with an elastic material and having one or more of the outside strips, on each side, projecting beyond the body of the block.

6. A composite block composed of strips of wire-cloth embedded in rubber and having one or more of the outside strips, on each side, projecting beyond the body of the block.

In testimony whereof I have hereunto affixed my signature in presence of two witnesses.

CHARLES W. ZARING.

Witnesses:
W. B. WHITNEY,
WALTER F. CARTER.